(12) United States Patent
Keränen et al.

(10) Patent No.: US 8,611,354 B2
(45) Date of Patent: Dec. 17, 2013

(54) METHOD AND APPARATUS FOR RELAYING PACKETS

(75) Inventors: Ari Keränen, Veikkola (FI); Jani Hautakorpi, Masala (FI); Jouni Mäenpää, Nummela (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 188 days.

(21) Appl. No.: 13/380,973

(22) PCT Filed: Jun. 29, 2009

(86) PCT No.: PCT/EP2009/058129
§ 371 (c)(1),
(2), (4) Date: Dec. 27, 2011

(87) PCT Pub. No.: WO2011/000405
PCT Pub. Date: Jan. 6, 2011

(65) Prior Publication Data
US 2012/0099599 A1 Apr. 26, 2012

(51) Int. Cl.
*H04L 12/28* (2006.01)

(52) U.S. Cl.
USPC ........................................................ 370/392

(58) Field of Classification Search
USPC ............... 370/315, 492, 501, 389; 726/26–30
See application file for complete search history.

(56) References Cited

U.S. PATENT DOCUMENTS

2007/0110054 A1* 5/2007 Kozakai et al. ............... 370/389
2007/0157303 A1* 7/2007 Pankratov ...................... 726/11
2007/0217407 A1* 9/2007 Yuan et al. ..................... 370/389
2010/0257276 A1* 10/2010 Savolainen ..................... 709/230

OTHER PUBLICATIONS

S. Perreault, et al.: "Traversal Using Relays Around NAT (TURN) Extensions for TCP Allocations; draft-ietf-behave-turn-tcp-03.txt" Traversal Using Relays Around NAT (TURN) Extensions for TCP Allocations; Draft-IETF-Behave-Turn-TCP-03.txt, Internet Engineering Task Force, IETF; Standardworkingdraft, Internet Society (ISOC) 4, Rue Des Falaises CH-1205 Geneva, Switzerland, vol. behave, No. 3, May 4, 2009, XP015062268 [retrieved on May 4, 2009] pp. 3-5; figure 1.

(Continued)

*Primary Examiner* — Chi Pham
*Assistant Examiner* — Fahmida Chowdhury
(74) *Attorney, Agent, or Firm* — Myers Bigel Sibley & Sajovec

(57) ABSTRACT

Apparatus for relaying packets between a first host and a second host and methods for sending packets between a first and second host are provided. The apparatus includes a memory for registering for the first host the following information: a relayed address of the first host, an address of the second host, and an outbound higher layer identifier and/or an inbound higher layer identifier. The apparatus further includes an outbound packet inspector for inspecting packets received from the first host and addressed to an address of the apparatus to determine whether they contain a registered outbound higher layer identifier and, if so, for forwarding the packets to the address of the second host and/or an inbound packet inspector for inspecting packets received from the second host and addressed to the relayed address to determine whether they contain a registered inbound higher layer identifier and, if so, for forwarding the packets to the address of the first host.

20 Claims, 6 Drawing Sheets

(56) References Cited

OTHER PUBLICATIONS

J. Rosenberg Cisco, et al.: "Traversal Using Relays Around NAT (TURN): Relay Extensions to Session Traversal Utilities for NAT (STUN); draft-ietf-behave-turn-07.txt" IETF Standard-Working-Draft, Internet Engineering Task Force, IETF, CH, vol. behave, No. 7, Feb. 25, 2008, XP015053106 ISSN: 0000-0004, pp. 7-9, pp. 15,16.
H. Schulzrinne, et al.: "GIST: General Internet Signaling Transport; draft-ietf-nsis-ntlp-08.txt" IETF Standard-Working-Draft, Internet Engineering Task Force, IETF, CH, vol. nsis, No. 8, Sep. 27, 2005, XP015040926, ISSN: 0000-0004, the whole document.

M. Komu, et al: "HIP Extensions for the Traversal of Network Address Translators; draft-ietf-hip-nat-traversal-02.txt", IETF Standard-Working-Draft, Internet Engineering Task Force, IETF, CH, vol. hip, No. 2, Jul. 6, 2007, XP015051263, ISSN: 0000-0004.
PCT International Preliminary Report on Patentability and annexes attached thereto issued on Nov. 17, 2011 for International Application No. PCT/EP2009/058129, filed Jun. 29, 2009 (12 pages).
PCT International Search Report and the Written Opinion of the International Searching Authority, or the Declaration issued on Mar. 25, 2010 for International Application No. PCT/EP2009/058129, filed Jun. 29, 2009 (20 pages).

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+-+-+-+-+-+-+-+-+-+-+-+-+-+-+-+-+-+-+-+-+-+-+-+-+-+-+-+-+-+-+-+-+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
|                             ....                              |
+-+-+-+-+-+-+-+-+-+-+-+-+-+-+-+-+-+-+-+-+-+-+-+-+-+-+-+-+-+-+-+-+
```

Figure 7

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Header   | Header Length |0| Packet Type | VER. | RES.|1|
+-+-+-+-+-+-+-+-+-+-+-+-+-+-+-+-+-+-+-+-+-+-+-+-+-+-+-+-+-+-+-+-+
|          Checksum             |           Controls            |
+-+-+-+-+-+-+-+-+-+-+-+-+-+-+-+-+-+-+-+-+-+-+-+-+-+-+-+-+-+-+-+-+
|                    Sender's Host Identity Tag (HIT)           |
|                                                               |
|                                                               |
|                                                               |
+-+-+-+-+-+-+-+-+-+-+-+-+-+-+-+-+-+-+-+-+-+-+-+-+-+-+-+-+-+-+-+-+
|                   Receiver's Host Identity Tag (HIT)          |
|                                                               |
|                                                               |
|                                                               |
+-+-+-+-+-+-+-+-+-+-+-+-+-+-+-+-+-+-+-+-+-+-+-+-+-+-+-+-+-+-+-+-+
|                                                               |
/                         HIP Parameters                        /
/                                                               /
|                                                               |
+-+-+-+-+-+-+-+-+-+-+-+-+-+-+-+-+-+-+-+-+-+-+-+-+-+-+-+-+-+-+-+-+
```

Figure 8

METHOD AND APPARATUS FOR RELAYING PACKETS

CROSS REFERENCE TO RELATED APPLICATIONS

This application is a 35 U.S.C. §371 national stage application of PCT International Application No. PCT/EP2009/058129, filed on 29 Jun. 2009, the disclosure and content of which is incorporated by reference herein in its entirety. The above-referenced PCT International Application was published in the English language as International Publication No. WO 2011/000405 A1 on 6 Jan. 2011.

TECHNICAL FIELD

The present invention relates to a method and apparatus for relaying packets. It is applicable to achieving traversal of a Network Address Translation (NAT) server and in particular to such a method and apparatus that makes use of the Traversal Using Relays around NAT (TURN) protocol.

BACKGROUND

Network Address Translation (NAT) is the process of modifying network address information in datagram packet headers while in transit across a traffic routing device for the purpose of remapping a given address space into another. NAT is used in conjunction with network masquerading (or IP masquerading) which is a technique that hides an entire address space, usually consisting of private network addresses, behind a single IP address in another, often public address space. This mechanism is implemented in a routing device that uses stateful translation tables to map the "hidden" addresses into a single address and then rewrites the outgoing Internet Protocol (IP) packets on exit so that they appear to originate from the router. In the reverse communications path, responses are mapped back to the originating IP address using the rules ("state") stored in the translation tables. The translation table rules established in this fashion are flushed after a short period without new traffic refreshing their state.

Of course, the use of Network Address Translation means that many hosts in the Internet cannot be contacted directly by other hosts because they are behind a Network Address Translator (NAT) that prevents inbound connections. Different NAT traversal techniques, e.g., Interactive Connectivity Establishment (ICE) [see J. Rosenberg. Interactive Connectivity Establishment (ICE): A Protocol for Network Address Translator (NAT) Traversal for Offer/Answer Protocols. draft-ietf-mmusicice-19 (work in progress). October 2007] have been developed to overcome this problem, but with certain kinds of NATs the only way to create a peer-to-peer connection between two hosts is to relay all the traffic through a node that both of the peers can contact (including the peer or peers behind a NAT).

Traversal Using Relays around NAT (TURN) [see Traversal Using Relays around NAT (TURN): Relay Extensions to Session Traversal Utilities for NAT (STUN). draft-ietf-behave-turn-15 (work in progress). February, 2009] allows a host (that is a TURN client) to register a "relayed address" (a combination of IP address and port number) at the TURN server such that a session is established "through" the NAT between the TURN server and the TURN client (nb. a connection initiated by the host behind the NAT will generally result in a session being established through the NAT and via which the node to which the connection is initiated can send packets to the host). A connection initiated by a remote peer to the relayed address is relayed by the TURN server to the TURN client, such that it passes through the punched hole in the NAT. The TURN client can send data to the peer via the TURN server such that, from the point of view of the peer, the data appears to originate from the relayed address. Using a TURN server, even with the most restrictive type of NATs, a communication path can be established between two peers.

After obtaining a relayed address from the TURN server, a TURN client needs to maintain its state in the NAT by sending periodic keep-alive messages to the TURN server via the NAT. To minimize the volume of keep-alive messages, TURN allows multiple connections with different peers to re-use the same relayed address. Thus, regardless of the number of peers, only one set of keep-alive messages is required. In addition to reducing the volume of keep-alive traffic, this method also conserves public ports at the TURN server and at the NAT allowing them to serve a larger number of simultaneous users.

In the case where multiple peer connections are multiplexed onto one connection between the TURN client and the TURN server, it is necessary to provide a mechanism which allows the TURN server and the TURN client to identify peers within the data packets that they exchange. For this purpose, data sent between the server and client is encapsulated within TURN messages.

TURN encapsulation increases the per-packet overhead and decreases the Maximum Transmission Unit (MTU) on the link between the TURN server and client. The overhead problem is especially severe in restricted bandwidth environments (e.g., when using a cellular data connection), and for data that is sent in multiple small packets (e.g., real time audio). More significantly perhaps, encapsulation prevents the use of unmodified operating system kernel protocol stacks for receiving and sending the data. This gives rise at least to performance problems, as data needs to be sent back and forth between the kernel and user space process. In the case of restricted operating systems (such as those commonly used in mobile devices) it may of course be impossible to feed the packets back to the kernel protocol stack or capture the packets after the stack processing. TURN encapsulation is not a viable option in such cases.

The Internet (IETF) draft—"Traversal Using Relays around NAT: Relay Extensions to Session Traversal Utilities for NAT (Jul. 8, 2007)" provides a mechanism for avoiding encapsulation. This mechanism makes use of the "Set Active Destination" request. However, the mechanism does not allow multiple sessions to be multiplexed onto the TURN server to client link.

SUMMARY

It is an object of the present invention to allow packets to be sent between a client and a relay server without using encapsulation, and which mitigates the problems of known solutions.

According to a first aspect of the present invention there is provided apparatus for relaying packets between a first host and a second host. The apparatus comprises a memory for registering for said first host; an address of the first host, a relayed address of the first host, an address of the second host, and an outbound Higher Layer Identifier and/or an inbound Higher Layer Identifier. The apparatus further comprises and one or both of:

an outbound packet inspector for inspecting packets received from said first host and addressed to an address of the apparatus to determine whether or not they contain a registered outbound Higher Layer Identifier and, if so, for forwarding the packets to said address of the second host; and an inbound packet inspector for inspecting packets received from said second host and addressed to said relayed address to determine whether or not they contain a registered inbound Higher Layer Identifier and, if so, for forwarding the packets to said address of the first host.

Embodiments of the invention allow packets to be sent between the first host and the apparatus, acting as relay server, without encapsulation in one or both of the inbound and outbound directions. The bandwidth occupied on the link between the first host and the apparatus can be reduced, whilst at the same time allowing multiple sessions to be multiplexed onto that link.

The outbound packet inspector, if present, may be configured to replace the address of the first host in a source address field of packets to be forwarded to said second host, with said relayed address.

The inbound packet inspector, if present, may be configured to replace said relayed address in a destination address field of packets to be forwarded to said first host, with said address of the first host, and to replace said address of the second host in a source address field of those packets with an address of the apparatus. The inbound packet inspector may be configured to deliver packets which contain said inbound Higher Layer Identifier, to said first host, without additional relay encapsulation.

The memory may be configured to additionally register for said first host an offset position for the or each of said inbound and outbound Higher Layer Identifiers, the offset position identifying a position of the associated Higher Layer Identifier within a packet, and the outbound and inbound packet inspectors being configured to use the respective offset position to determine the presence of a Higher Layer Identifier.

The memory and the or each of said inbound packet inspector and said outbound packet inspector may be configured to additionally handle the relaying of packets between said first host and one or more further hosts using one or both of the inbound and outbound Higher Layer Identifiers.

The invention is applicable to the case where said first host is located behind a Network Address Translator, and said address of the first host is a NATed address of the first host. In this case, any additional relay encapsulation is encapsulation according to the Traversal Using Relays around NAT protocol. The apparatus acting as relay server may comprise a client terminal registration unit for registering said first host and any further hosts, the registration unit being configured to use the Traversal Using Relays around NAT, TURN, protocol.

According to a second aspect of the present invention there is provided a client terminal configured to exchange packets with a peer terminal via a relay server. The client terminal comprises a relay unit for registering with the relay server so as to be allocated a relayed address by the relay server, and an identification determining unit for determining an inbound Higher Layer Identifier to be used in packets exchanged with said peer terminal. The terminal further comprises an identifier registration unit for registering the inbound Higher Layer Identifier with said relay server, together with said relayed address, an address of the client terminal, and an address of the peer terminal, and a packet handler for associating packets received from said relay server with said peer terminal using said inbound Higher Layer Identifier.

The identification determining unit of the terminal may be configured to determine an outbound Higher Layer Identifier to be used in packets exchanged with said peer terminal, with said identifier registration unit being configured to register the outbound Higher Layer Identifier with said relay server together with the inbound Higher Layer Identifier.

The identification determining unit may be configured to determine inbound and/or outbound Higher Layer Identifiers by identifying and using one of the following protocol parameters: a Host Identity Tag, HIT; a synchronisation source (SSRC) identifier; a Security Parameter Index (SPI); TCP port numbers.

The relay unit may be configured to implement NAT traversal and said address of the client terminal being a NATed address. In this case, the relay unit and said identifier registration unit may be configured to use the Traversal Using Relays around NAT, TURN, protocol. A further packet handler may be provided for using Traversal Using Relays around NAT, TURN, encapsulation to send and/or receive packets to a peer terminal in the event that said identification determining unit is unable to determine an inbound and, optionally, an outbound Higher Layer Identifier, or a TURN encapsulated packet is received from said relay server.

The relay unit may be configured to determine whether or not a relay server supports a Higher Layer Identifier based relaying method and, if not, to initiate packet routing with said peer terminal using relaying encapsulation.

According to a third aspect of the present invention there is provided a method of sending packets between a first host and a second host. The method comprises registering at a relay server, on behalf of the first host an address of the first host, a relayed address of the first host, an address of the second host, and an outbound Higher Layer Identifier and/or an inbound Higher Layer Identifier. The method further comprises one or both of the steps of:

at the relay server, inspecting packets received from said first host and addressed to an address of the relay server to determine whether or not they contain said outbound Higher Layer Identifier and, if so, forwarding the packets to said address of the second host; and inspecting packets received from said second host and addressed to said relayed address to determine whether or not they contain said inbound Higher Layer Identifier and, if so, forwarding the packets to said address of the first host.

The first host may be located behind a Network Address Translator., in which case said step of registering may be carried out using the Traversal Using Relays around NAT, TURN, protocol. Packets sent from the relay server to the first host may be forwarded using TURN encapsulation if packets received from the second host do not contain said inbound Higher Layer Identifier.

BRIEF DESCRIPTION OF THE DRAWINGS

FIG. 7 illustrates schematically an RTP packet format; and

FIG. 8 illustrates schematically a HIP packet format.

DETAILED DESCRIPTION

Figure 1:
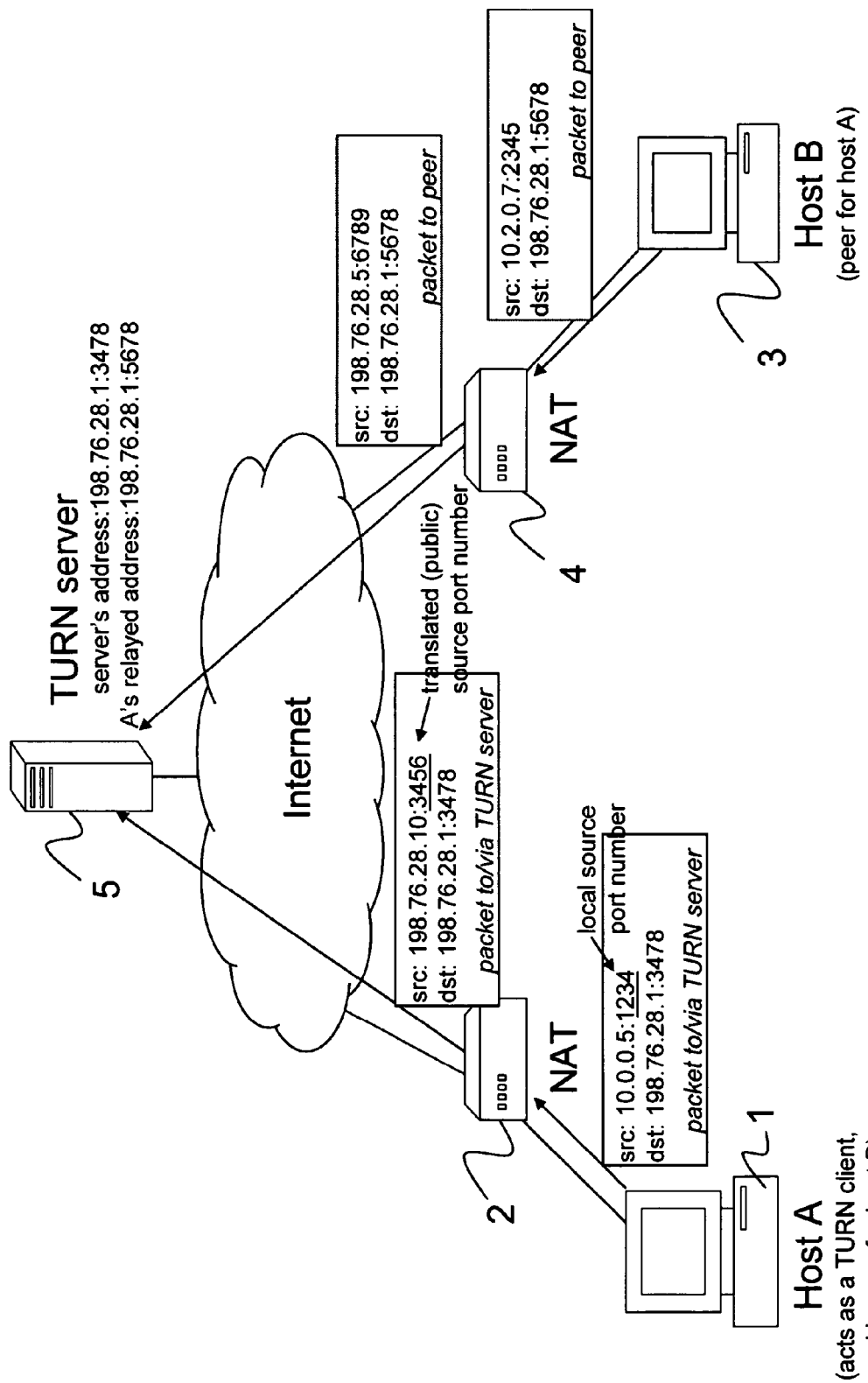
FIG. 1 illustrates schematically a network communication scenario involving NAT traversal using TURN.

The problem of NAT traversal has been considered above in the context of TURN encapsulation. An enhancement to TURN and other NAT traversal solutions using data relaying will now be described.

Data that may otherwise be the subject of TURN encapsulation between the TURN client and the TURN server will often include a persistent Higher Layer Identifier (HLI) at a consistent location within packets. It is proposed here to make use of such a HLI on top of the transport layer protocol, to multiplex/demultiplex packets in place of TURN encapsulation. When a TURN client wants to communicate with a peer without using TURN encapsulation, it first checks with the TURN server to determine whether or not the TURN server supports the HLI mechanism described here. If so, then the TURN client registers a pair of HLIs (one inbound and one outbound) at the TURN server. A TURN server HLI registration contains two byte arrays (one for each HLI), as well as an array length, offset and peer address. For inbound traffic, when the TURN server receives a packet directed to the relayed address, it checks to see if the packet data matches a registered inbound HLI and, if it does, it sends the packet without any encapsulation to the TURN client as the inbound HLI will uniquely identify the peer address to the TURN client. When the TURN server receives a packet from the TURN client, it checks to see if the packet data matches a registered outbound HLI and, if it does, the packet is sent to the peer address that was registered for that outbound HLI (the public address allocated to the TURN client by the NAT, i.e. the "NATed" address of the client, which is included as the source address of the packet received at the TURN server, is switched for the relayed address according to normal TURN behaviour).

The HLI can be any byte array whose value and location is known before data is sent or received. The length of the arrays and their offsets (i.e. how many bytes after the transport layer header the HLI starts) can be defined at registration of the HLIs (by TURN client) with the TURN server. For example, in the case of UDP encapsulated ESP [RFC3948], the SPI value could be used as the HLI. Another example of a potential HLI would be a TCP port number if TCP is tunneled over UDP and relayed through a TURN server. A Real-time Transport Protocol's (RTP) synchronization source identifier is another example of an HLI.

Packets sent to the relayed address (from a peer) that do not match to a registered HLI are forwarded by the TURN server to the TURN client with TURN encapsulation. Any packets arriving at the TURN server from the TURN client that do not contain a match to any registered HLI are assumed to be TURN encapsulated. This behaviour allows a TURN server including the new functionality to be compatible with legacy TURN clients, and to be useable with traffic which does not include useable HLIs.

If data associated with a certain protocol needs to be exchanged between the TURN client and a single peer only, any constant field in the protocol header that is different from other concurrently relayed protocols is sufficient. For example, a protocol version number or a magic cookie value could be sufficient for this purpose. A "magic cookie" value (in this context) is a constant value in a protocol header that is used for differentiating certain protocol messages from messages associated with other protocols in the same stream. For example, STUN [RFC5389], the protocol used by TURN and ICE, carries this kind of identifier in all messages.

If, on the other hand, messages using the same protocol are exchanged by the TURN client with multiple peers, an identifier that is different for each peer is needed. Many protocols have some identifier in each packet for the source and/or destination of the data (e.g., HIP sender and receiver HITs or RTP synchronization source). For other protocols, it may be necessary to generate a HLI by combining information in multiple protocol fields.

Usually the TURN client knows implicitly the value for the outbound HLI since it is the entity originating the packets and generating the higher layer messages. If an external protocol stack (such as IPsec provided by the operating system) is used and the stack generates the value used as the HLI, the client may need to query the value from the stack or look it up from sent packets.

If the TURN client knows a priori the HLI value for the peer (e.g., it is a constant protocol field or certain peers always use the same value), no additional signaling is needed before registering HLIs at the TURN server. For example, in the case of HIP signaling traffic, hosts know the Host Identity Tags (HITs) that will be used in the HIP header even prior to contacting each other since a HIT is calculated from a host identity. Hence, HITs can be used as HLIs without any extra signaling. If however the HLI is not known a priori by the TURN client, the TURN client needs to learn the HLI value either from protocol signaling or automatically from the first received packet. Of course, that signalling (assuming that it goes through the TURN server and not via some other relay, e.g. a SIP server or HIP relay server) or first data packet must be TURN encapsulated. By way of example, consider an IPsec security association set up using IKE [RFC4306] or HIP. The hosts negotiate the SPI value that will be inserted into the beginning of every encrypted ESP packet. Thus, before any data is sent, the TURN client learns the peer's SPI value that it can utilize as HLI. The methods described do not require any support for HLI, or even for regular TURN, in the peer. An alternative approach that does require HLI support in the peer involves the TURN client explicitly asking the peer (using e.g., new STUN/TURN messages) for an HLI value.

Figure 2:
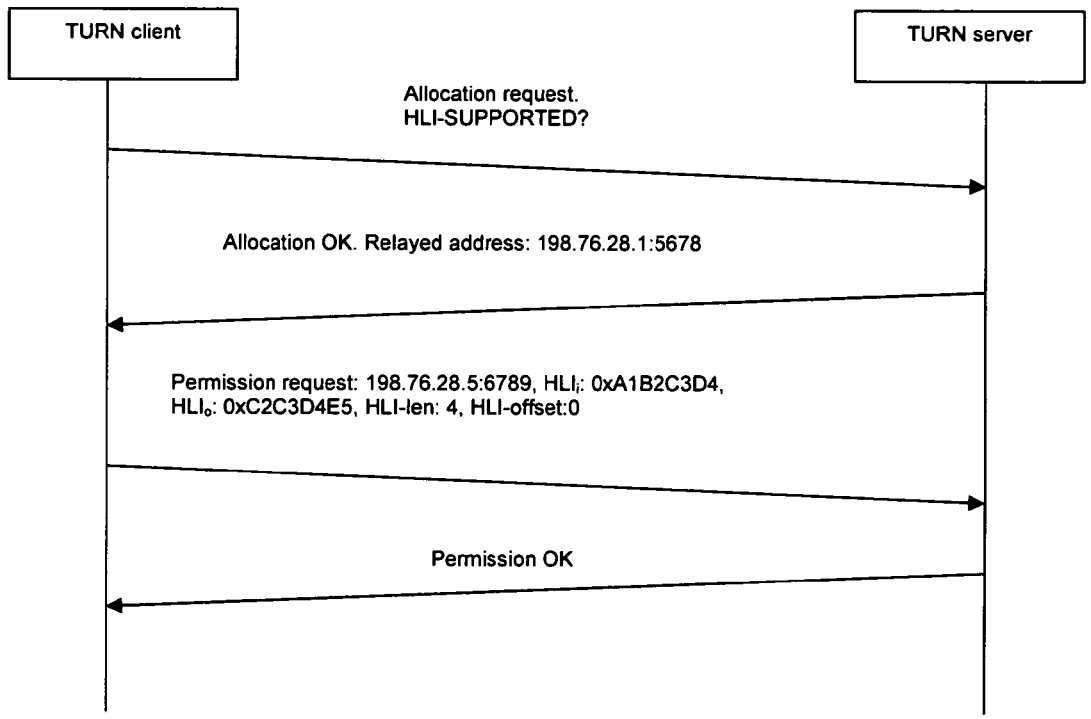
FIG. 2 illustrates registration signalling in the network scenario of FIG. 1 and associated with the modified TURN protocol.

To illustrate the proposed approach to implementing TURN without necessarily requiring TURN encapsulation, consider the case of UDP encapsulated ESP. FIG. 1 illustrates schematically a TURN client (Host A) 1 that is behind a NAT 2. A peer, Host B, 3 is also behind a NAT 4, and wishes to communicate with Host A using UDP encapsulated ESP. This is achieved using a TURN server (or relay) 5. FIG. 1 shows exemplary source (src) and destination (dst) IP addresses and port numbers included in packets at various points in the network. FIG. 2 illustrates signalling associated with this scenario. A TURN client that supports the HLI extension first registers at the TURN server using a standard TURN allocation request (step 1). The client includes HLI-SUPPORTED parameter in the request to test whether the TURN server supports this extension. If the server supports HLI relaying, it responds with an Allocation OK message (step 2). If however the TURN server does not support HLI relaying, it rejects the request and the client can either register to the server without the extension or try some other TURN server. The HLI-SUPPORTED parameter has "comprehension-required" [RFC5389] type so that if a (legacy) TURN server does not recognize it, it rejects the request. One or both of the hosts in FIG. 1 may be located behind multiple NATs. This does not change the principle of the relaying process.

Next, the hosts negotiate IPsec Security Associations. They can use for example HIP or IKE for this purpose. The negotiation can be done either through the TURN server or using some other relaying service such as HIP relay server [id-hip-nat-traversal: see Basic HIP Extensions for Traversal of Network Address Translators. draft-ietf-hip-nat-traversal-06

(work in progress). March 2009] or a peer-to-peer overlay network. If a TURN server is involved in the IPsec signalling, the signaling messages are TURN encapsulated between the TURN server and client unless HLIs have been set for the signaling protocol.

Figure 3:
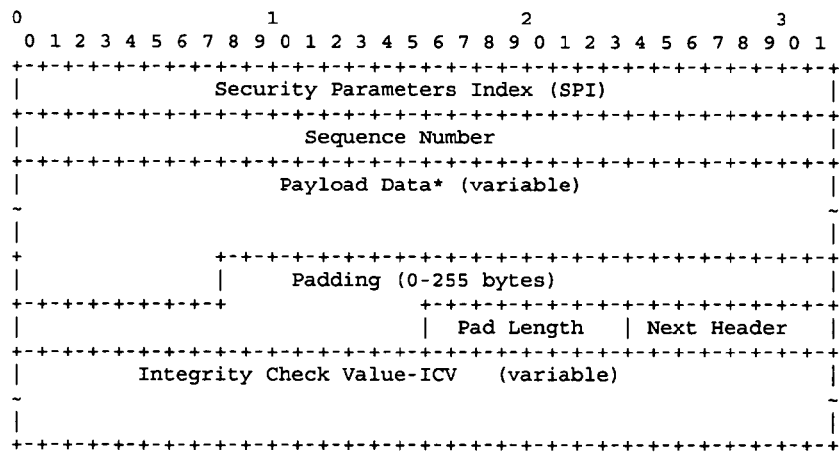
FIG. 3 illustrates schematically an ESP packet format.

The TURN client then requests "permissions" for the peer and includes the inbound and outbound HLIs that should be checked against all relayed data (step 3). The TURN server responds with a Permission OK (step 4). Permissions are part of the normal TURN behavior and increase security by allowing only peers with registered permission to use the relayed address. The HLI registration is piggybacked on the standard permission registration procedure. As the client will use UDP encapsulated ESP, it registers the SPI values for the peer (at address 198.76.28.5:6789) as the HLIs. In the example of FIG. 1, the inbound SPI is "0xA1B2C3D4" and the outbound SPI is "0xB2C3D4E5". Both parameters are four bytes long and start immediately after the UDP header (HLI offset is zero) since the SPI is always in the first four bytes of the ESP packet. At the TURN client, the peer's address in the IPsec SAs is set to the TURN server's address so that the IPsec stack sends ESP packets, destined for the peer, to the TURN server. FIG. 3 illustrates the packet format of ESP.

Figure 4:
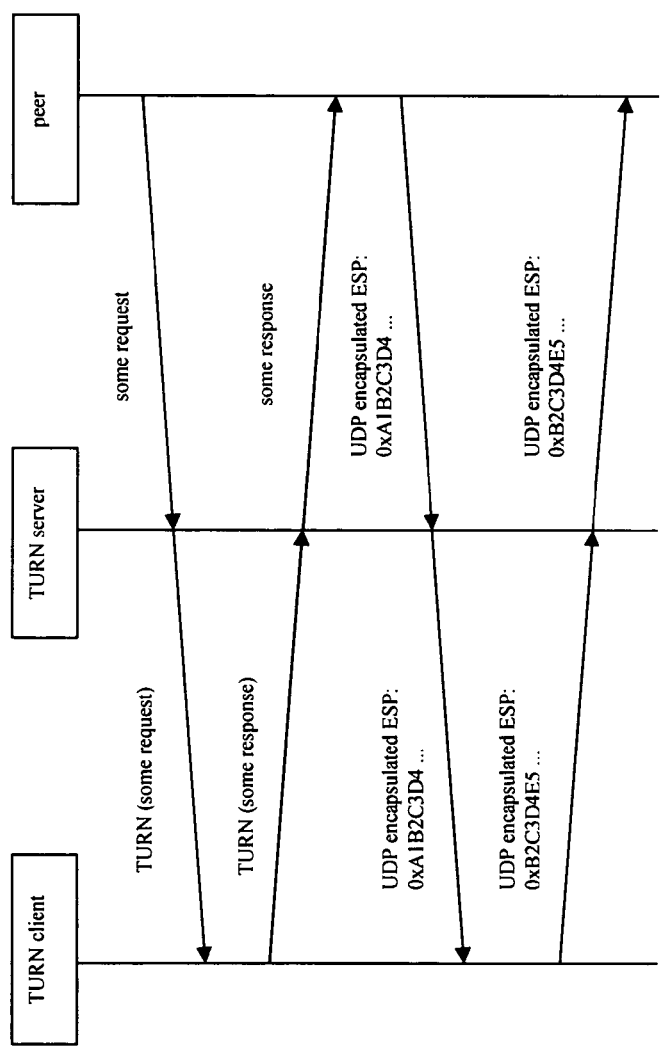
FIG. 4 illustrates packet relaying in the network scenario of FIG. 1.

FIG. 4 illustrates an exchange of ESP packets between the TURN client and the peer (the lower message sequence in the Figure) and which does not require TURN encapsulation. When the peer sends a packet that does not match to the registered HLI (in this example, something other than ESP, e.g., a NAT traversal connectivity check message or a signaling protocol message), the data is forwarded to the client with TURN encapsulation (the upper sequence in FIG. 4). The client can reply to the message by encapsulating the response and signaling the peer's address in the encapsulation meta data. When the TURN server relays the response, it removes the TURN encapsulation. After receiving the response, the peer sends UDP encapsulated ESP packets with an SPI that matches the registered HLI. The TURN server detects the match and forwards the packets without any encapsulation. The TURN client's IPsec stack receives the data and processes it accordingly. When the program using IPsec sends data back to the peer, the IPsec stack automatically sends the data (with only UDP encapsulation) to the TURN server. The TURN server detects that the data matches to a registered HLI and forwards the data to the peer whose address was registered for the HLI. It will be readily apparent that the great majority of the packets exchanged do not require TURN encapsulation when utilising the approach described here.

While the method above uses simple byte arrays for matching data to permissions, more complicated forwarding rules could be implemented. For example, one could augment the byte arrays with bit-masks and allow bit-level checks for multiplexing the connections. Also, instead of just a single forwarding rule, a TURN client could add multiple rules that all match to a certain peer address. Even logical operations taking into account multiple byte/bit positions in the data could be used for selecting a rule. This would make it possible, for example, to forward all packets to the TURN client without encapsulation, except for packets relating to NAT traversal connectivity checks (and for which the real sender address information is necessary).

Figure 5:
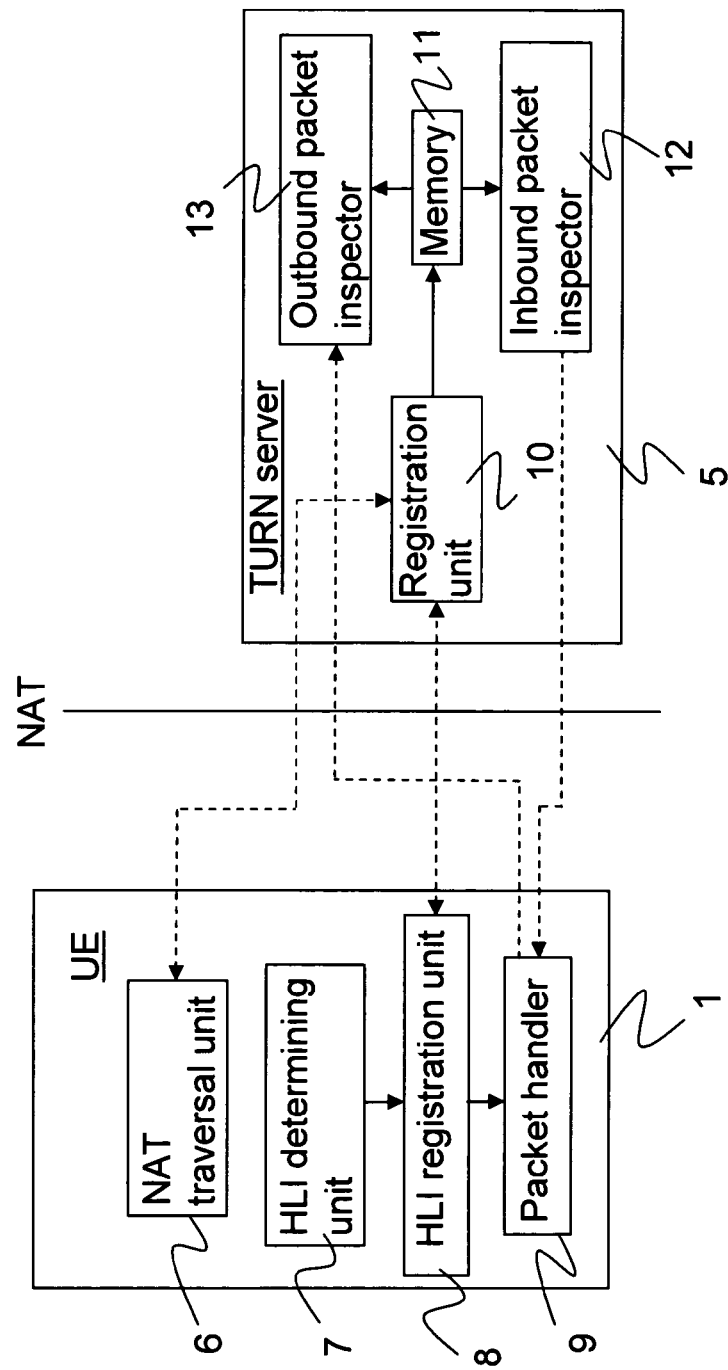
FIG. 5 illustrates schematically a TURN client and TURN server of the network scenario of FIG. 1.

FIG. 5 illustrates schematically a client terminal 1 (or UE) and a TURN server 5 configured to implement the approach described above (with a NAT interposed between these two entities). Within the UE 1, a NAT traversal unit 6 is provided, the role of which is to register the UE with TURN server in order to allocate to the UE a relayed address. An HLI determining unit 7 is provided to determine appropriate HLIs for both inbound and outbound flows towards a given peer. Once determined, these HLIs are passed to an HLI registration unit 8 which registers the HLIs with the TURN server, in association with the address of the peer. The registration details are also passed to a packet handler 9 which uses the HLIs and the peer's address to determine whether or not TURN encapsulation is required for outgoing packets, and to correctly route incoming packets to higher layers.

FIG. 5 further illustrates the TURN server 5. This comprises a client terminal registration unit 10 and associated memory 11 for registering HLI associations for the UE 1. An inbound packet inspector 12 is configured to examine packets addressed to the relayed address to identify the registered inbound HLI, and to forward such packets to the UE without TURN encapsulation. An outbound packet inspector 13 is configured to identify the registered outbound HLI in packets received from the UE, and to route packets to the destination address of the peer accordingly. It will be appreciated of course that the TURN server will handle multiple HLI registrations in parallel for different UEs (and also, potentially, for the same UE).

Figure 6:
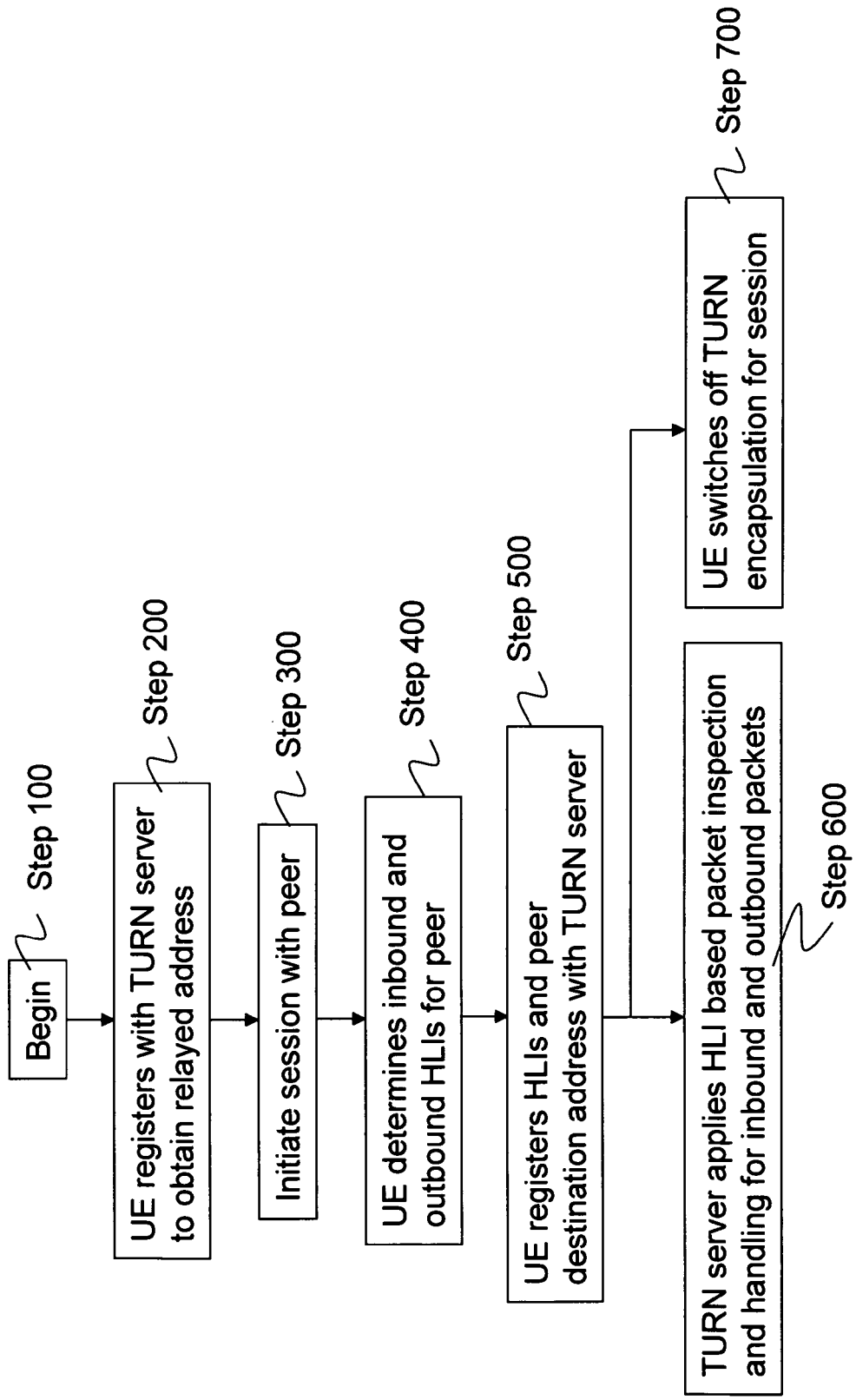
FIG. 6 is a flow diagram illustrating TURN server registration and packet relay processes.

FIG. 6 is a flow diagram illustrating the main steps in the HLI based packet handling process. The process begins at step 100, and at step 200 the UE registers itself with the TURN server to obtain a relayed address. This registration may occur before the user decides to initiate a session. Assuming that this is the case, at step 300 the user initiates a session with a peer, via the UE. This step may be in response to receipt of a session initiation message from the peer (e.g. received via the TURN server using TURN encapsulation or via some other relay server). At step 400 the UE then determines inbound and outbound HLIs for the session, and registers these with the TURN server, in association with an address of the peer, at step 500. Following completion of this registration step, at steps 600 and 700, the UE and TURN server handle packets as described, to avoid TURN encapsulation between the UE and the TURN server. Steps 600 and 700 are performed in parallel.

The following subsections illustrate how HLI relaying can be used with some example protocols, other than ESP. The list is not exhaustive however, and the skilled person will appreciate that the approach described is applicable to a large number of different protocols.

Real-Time Transport Protocol (RTP)

RTP [RFC3550: RTP: A Transport Protocol for Real-Time Applications. RFC 3550. July 2003] packets start with a fixed header, as illustrated in FIG. 7. The SSRC field, used to label streams from different sources, contains a random number that is required to be globally unique within an RTP session. When using RTP with HLI relaying, the TURN client sets its outbound HLI to match to its own SSRC used with a certain peer, and its inbound HLI to match the SSRC of the peer.

Host Identity Protocol (HIP)

A HIP [RFC5201: Host Identity Protocol. RFC 5201. April 2008] packet header is logically an IPv6 extension header and its format is shown in FIG. 8. The sender and receiver Host Identity Tags (HITs) identify the communicating endpoints and are therefore suitable for HLIs. The TURN client using HLI relaying sets the outbound HLI to match the "receiver's HIT" with the peer's HIT and the inbound HLI to match the "sender's HIT" with the peer's HIT.

TCP port numbers may also be used as HLIs in the case where TCP packets are encapsulated in UDP.

It will be apparent from the above discussion that HLI-based relaying removes or reduces the bandwidth overhead created by TURN encapsulation between the TURN client and server. Also, the processing overhead is reduced since there is no need to add and remove the encapsulation headers at TURN client and server. Furthermore, native operating system stacks can be used for handling the relayed data due to the absence of a requirement for encapsulation. The solution is backward compatible with existing TURN clients and does not require HLI support from peers.

The extended TURN server described here is not protocol dependent and the HLI-based relaying can be achieved for any protocol that is carried over UDP and contains sufficient markers that can be used for multiplexing connections. Even where a protocol does not provide for such markers, if there is no requirement for multiplexing multiple connections (e.g., only a single connection through the TURN server is used), HLIs with zero length can be used to make TURN encapsulation unnecessary.

HLIs registered with the TURN server may be considered more generally as a rule set. For example, where no single, unique, identifier is present in packets a rule set such as, "If HLI_1 is at position 1 and HLI_2 in position 2 but there is no HLI_3 in position 3, a packet matches to a relaying rule/permission" may be specified and registered with the TURN server.

It will be appreciated by the person of skill in the art that various modifications may be made to the above described embodiments without departing from the scope of the present invention. For example, the approach may be applied to relaying protocols other than TURN (and which use encapsulation of the relayed packets), e.g. SOCKS 5 (IETF RFC 1928), and indeed to further enhancements of the currently specified TURN protocol, for example. Certain embodiments may allow the TURN server, or some other network based node, to determine the HLIs to be used for a session. In this case, that determining node may signal the HLI(s) to the TURN client, and also to the TURN server if the node is not itself the TURN server. The skilled person will also appreciate that the relaying mechanism described here is not only applicable to NAT traversal. It could for example be applied to a scenario where a client makes use of a relay server in order to maintain anonymity. The skilled person will also appreciate that a benefit may be achieved by applying this HLI-based approach in only one of the inbound and outbound directions, and not both.

The invention claimed is:

1. Apparatus for relaying packets between a first host and a second host, the apparatus comprising:
   a memory for registering information for the first host as follows:
   an address of the first host;
   a relayed address of the first host;
   an address of the second host; and
   an outbound Higher Layer Identifier and/or an inbound Higher Layer Identifier;
   and at least one inspector coupled to the memory, the at least one inspector comprising:
   an outbound packet inspector for inspecting packets received from the first host and addressed to an address of the apparatus to determine whether they contain a registered outbound Higher Layer Identifier and, if so, for forwarding the packets to the address of the second host; and/or an inbound packet inspector for inspecting packets received from the second host and addressed to the relayed address to determine whether they contain a registered inbound Higher Layer Identifier and, if so, for forwarding the packets to the address of the first host.

2. An apparatus according to claim 1, wherein the outbound packet inspector is configured to replace the address of the first host in a source address field of packets to be forwarded to said second host, with the relayed address.

3. An apparatus according to claim 1, wherein the inbound packet inspector is configured to replace the relayed address in a destination address field of packets to be forwarded to the first host, with the address of the first host, and to replace the address of the second host in a source address field of those packets with an address of the apparatus.

4. An apparatus according to claim 1, wherein the inbound packet inspector is configured to deliver packets which contain the inbound Higher Layer Identifier, to the first host, without additional relay encapsulation.

5. An apparatus according to claim 1, wherein the memory is configured to additionally register for the first host an offset position for each of the inbound and outbound Higher Layer Identifiers, the offset position identifying a position of the associated Higher Layer Identifier within a packet, and wherein the outbound and inbound packet inspectors are configured to use the respective offset position to determine the presence of the Higher Layer Identifier.

6. An apparatus according to claim 1, wherein the memory and each of the inbound packet inspector and the outbound packet inspector are configured to additionally handle the relaying of packets between said first host and one or more additional hosts using at least one of the inbound and outbound Higher Layer Identifiers.

7. An apparatus according to claim 1, wherein the first host is located behind a Network Address Translator(NAT), and the address of the first host is a NAT address of the first host.

8. An apparatus according to claim 7, wherein the additional relay encapsulation is encapsulation according to Traversal Using Relays around NAT protocol.

9. An apparatus according to claim 8, further comprising a client terminal registration unit for registering the first host and any additional hosts, the registration unit being configured to use the Traversal Using Relays around NAT, TURN, protocol.

10. A client terminal configured to exchange packets with a peer terminal via a relay server, the client terminal comprising:
    a relay unit for registering with the relay server so as to be allocated a relayed address
    by the relay server;
    an identification determining unit for determining an inbound Higher Layer Identifier to be used in packets exchanged with the peer terminal;
    an identifier registration unit for registering the inbound Higher Layer Identifier with the relay server, together with the relayed address, an address of the client terminal, and an address of the peer terminal; and
    a packet handler for associating packets received from the relay server with the peer terminal using the inbound Higher Layer Identifier.

11. A client terminal according to claim 10, wherein the identification determining unit is configured to determine an outbound Higher Layer Identifier to be used in packets exchanged with the peer terminal, and the identifier registration unit is configured to register the outbound Higher Layer Identifier with the relay server together with the inbound Higher Layer Identifier.

12. A client terminal according to claim 9, wherein the identification determining unit is configured to determine inbound and/or outbound Higher Layer Identifiers by identifying and using at least one protocol parameter as follows:
    a Host Identity Tag (HIT);
    a synchronization source (SSRC) identifier;
    a Security Parameter Index (SPI); and
    TCP port numbers.

13. A client terminal according to claim 10, wherein the relay unit is configured to implement NAT traversal and the address of the client terminal being a NAT address.

14. A client terminal according to claim 13, wherein the relay unit and the identifier registration unit are configured to use Traversal Using Relays around NAT, TURN, protocol.

15. A client terminal according to claim 13, further comprising a packet handler for using Traversal Using Relays around NAT, TURN, encapsulation to send and/or receive packets to a peer terminal when the identification determining unit is unable to determine an inbound and/or, an outbound Higher Layer Identifier, or a TURN encapsulated packet is received from the relay server.

16. A client terminal according to claim to 13, wherein the relay unit is configured to determine whether a relay server supports a Higher Layer Identifier based relaying method and, if not, to initiate packet routing with the peer terminal using relaying encapsulation.

17. A method of sending packets between a first host and a second host, the method comprising:
   registering at a relay server, on behalf of the first host:
      an address of the first host;
      a relayed address of the first host;
      an address of the second host; and
      an outbound Higher Layer Identifier and/or an inbound Higher Layer Identifier;
   and performing at least one of:
   at the relay server, inspecting packets received from the first host and addressed to an address of the relay server to determine whether they contain outbound Higher Layer Identifier and, if so, forwarding the packets to the address of the second host; and
   inspecting packets received from the second host and addressed to the relayed address to determine whether they contain the inbound Higher Layer Identifier and, if so, forwarding the packets to the address of the first host.

18. A method according to claim 17, wherein the first host is located behind a Network Address Translator.

19. A method according to claim 18, wherein registering is carried out using Traversal Using Relays around NAT, TURN, protocol.

20. A method according to claim 19, further comprising forwarding the packets from the relay server to the first host using TURN encapsulation if packets received from the second host do not contain the inbound Higher Layer Identifier.

* * * * *

UNITED STATES PATENT AND TRADEMARK OFFICE
CERTIFICATE OF CORRECTION

| | | |
|---|---|---|
| PATENT NO. | : 8,611,354 B2 | Page 1 of 1 |
| APPLICATION NO. | : 13/380973 | |
| DATED | : December 17, 2013 | |
| INVENTOR(S) | : Keranen et al. | |

It is certified that error appears in the above-identified patent and that said Letters Patent is hereby corrected as shown below:

In the Claims:

In Column 11, Line 11, in Claim 15, delete "and/or," and insert -- and/or --, therefor.

In Column 11, Line 14, in Claim 16, delete "according to claim to 13," and insert -- according to claim 13, --, therefor.

Signed and Sealed this
Twenty-second Day of July, 2014

Michelle K. Lee
*Deputy Director of the United States Patent and Trademark Office*